(12) United States Patent
Im

(10) Patent No.: US 9,924,348 B2
(45) Date of Patent: Mar. 20, 2018

(54) COMMUNICATION DEVICE AND METHOD OF CONTROLLING BASED ON WIRELESS COMMUNICATION ENVIRONMENT

(71) Applicant: Samsung Electronics Co., Ltd., Gyeonggi-do (KR)

(72) Inventor: Se-Bin Im, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/286,210

(22) Filed: Oct. 5, 2016

(65) Prior Publication Data
US 2017/0127343 A1 May 4, 2017

(30) Foreign Application Priority Data

Oct. 28, 2015 (KR) .................. 10-2015-0150166

(51) Int. Cl.
*H04W 4/00* (2009.01)
*H04W 8/20* (2009.01)

(52) U.S. Cl.
CPC .................... *H04W 8/20* (2013.01)

(58) Field of Classification Search
None
See application file for complete search history.

(56) References Cited

U.S. PATENT DOCUMENTS

| 6,775,372 B1 | 8/2004 | Henits |
| 2009/0023448 A1* | 1/2009 | Attar ............. H04W 36/0061 455/436 |
| 2013/0344859 A1* | 12/2013 | Abramson ........... G06Q 50/265 455/418 |

FOREIGN PATENT DOCUMENTS

WO   WO 2015/017161   2/2015

* cited by examiner

*Primary Examiner* — Idowu O Osifade
(74) *Attorney, Agent, or Firm* — The Farrell Law Firm, P.C.

(57) ABSTRACT

Apparatuses, methods, and systems for providing control information to a communication device are described. In the method, it is determined whether a communication device has received device control information from a central management server (CMS) while in a first wireless communication environment, where the device control information is for controlling the communication device in a second wireless communication environment. If the device control information is received while the communication device is still in the first wireless communication environment, the communication device uses the received device control information when in the second wireless communication environment.

16 Claims, 7 Drawing Sheets

COMMUNICATION DEVICE AND METHOD OF CONTROLLING BASED ON WIRELESS COMMUNICATION ENVIRONMENT

PRIORITY

This application claims priority under 35 U.S.C. § 119(a) to Korean Patent Application Serial No. 10-2015-0150166, which was filed in the Korean Intellectual Property Office on Oct. 28, 2015, the entire contents of which is incorporated herein by reference.

BACKGROUND

1. Field of the Disclosure

The present disclosure relates generally to a communication device and a control method thereof and, more particularly, to controlling a communication device based on its own moving pattern, control information according to the moving pattern, and a control method thereof.

2. Description of the Related Art

Wireless communication systems provide high-speed data communication as well as various multimedia services. The Long Term Evolution (LTE) wireless communication system, which was proposed by the 3rd Generation Partnership Project (3GPP) standard group, provides services in multiple countries. The LTE system is a technology which implements high-speed packet based communication providing a transmission rate of about 100 Mbps. Presently, efforts are being made with regard to future communication systems, i.e., after (beyond) the 4G network and the LTE system, systems which improve the transmission rate by combining various new technologies with LTE or LTE-Advanced (LTE-A) systems.

In order to operate, a communication device such as a User Equipment (UE), the UE measures and collects pieces of information related to its wireless communication environment. For example, a UE repeatedly performs cell searches and signal quality measurements of cells neighboring its serving cell in order to select the cell having a better reception performance.

However, communication devices are controlled according to predetermined operation methods with respect to changes in the wireless communication environment (e.g., changes in position and/or speed). Many communication devices are controlled by only a limited logic structure (i.e., a passive logic structure) and cannot be controlled according to a variable logic structure (i.e., an active/adaptive logic structure) which considers empirical information. As such, many communication devices can only operate according to the current wireless communication environment, and cannot predict its own moving pattern or operate according to control information generated based on predicting its own moving pattern.

SUMMARY

The present disclosure has been made to address at least the problems and/or disadvantages described above and to provide at least the advantages described below.

According to an aspect of the present disclosure, a communication or electronic device is controlled by device control information based on theoretical model information and empirical information supplementing the theoretical model information so that the communication or electronic device has an improved and/or more enhanced performance.

Further, according to an aspect of the present disclosure, the moving pattern of a communication or electronic device is predicted and the communication or electronic device is controlled according to control information obtained on the basis of the predicted moving pattern so that the communication or electronic device has an improved and/or more enhanced performance.

In accordance with an aspect of the present disclosure, there is provided a communication device. The communication device includes a transceiver; a memory; and a processor that is electrically connected to the transceiver and the memory, wherein the processor determines if device control information for a second wireless communication environment has been received from a central management server (CMS) while in a first wireless communication environment, overrides the first control information when in the second wireless communication environment, and controls the communication device according to the device control information received from the CMS while in the second wireless communication environment.

In accordance with another aspect of the present disclosure, there is provided a method of controlling a communication device. The method includes determining whether device control information for a second wireless communication environment has been received from a central management server (CMS) while in a first wireless communication environment; if device control information has been received from the CMS, overriding the first control information with the device control information from the CMS when in the second wireless communication environment; and controlling the communication device according to the device control information received from the CMS while in the second wireless communication environment.

In accordance with another aspect of the present disclosure, a method is provided for a central management server (CMS) capable of communicating with a communication device, the method including determining whether to send device control information to a moving communication device for a next wireless communication environment the device will enter while the moving communication device is still in a current wireless communication environment; and, if it is determined to send device control information to the moving communication device for the next wireless communication environment, transmitting the device control information to the moving communication device while it is still in the current wireless communication environment.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1A:
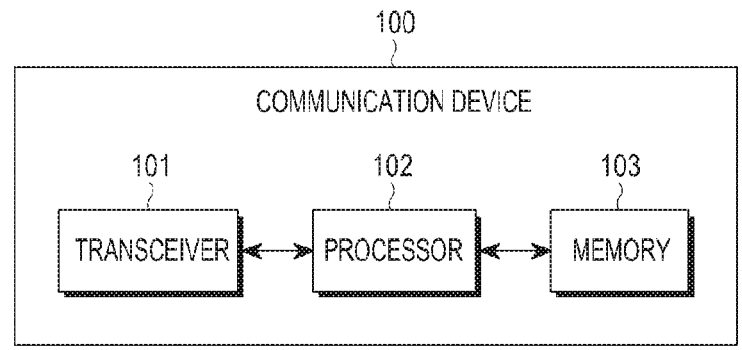
FIG. 1A is a block diagram of a communication device according to an embodiment of the present disclosure.

Hereinafter, various embodiments of the present disclosure will be described with reference to the accompanying drawings. However, it should be understood that the present disclosure is not limited to the particular forms disclosed herein; rather, the present disclosure should be construed to cover various modifications, equivalents, and/or alternatives of the embodiments of the present disclosure described herein. In describing the accompanying drawings, similar reference numerals may be used to designate similar elements.

As used herein, the terms "have", "may have", "include", or "may include" refer to the existence of a corresponding feature (e.g., a numeral, function, operation, or component), and are not intended to exclude one or more additional features.

In the present disclosure, the terms "A or B", "A and/or B", "at least one of A and/or B", or "one or more of A and/or B" may include all possible combinations of the items listed. For example, the terms "A or B", "A and/or B", "at least one of A and B", or "at least one of A or B" may refer to all of (1) at least one A, (2) at least one B, or (3) at least one A and at least one B.

The terms "a first", "a second", "a third", etc., are used in various embodiments of the present disclosure to identify various components regardless of their order and/or importance and do not define and/or otherwise limit those components in terms of order, importance, etc. For example, a first user device and a second user device may indicate two different user devices. Accordingly, a first element may be referred to as a second element, and similarly, a second element may be referred to as a first element without departing from the scope and spirit of the present disclosure.

When an element (e.g., a first element) is referred to as being (operatively or communicatively) "connected," or "coupled" to another element (e.g., a second element), it may be either directly connected/coupled to the other element or another element (e.g., a third element) may be interposed between them. In contrast, when an element is referred to as being "directly connected," or "directly coupled" to another element, there is no element interposed between them.

In the present disclosure, the term "configured to" may be used interchangeably with, for example, "suitable for", "having the capacity to", "designed to", "adapted to", "made to", or "capable of" according to the situation/context. The term "configured to" may not necessarily indicate "specifically designed to" perform the listed function/operation. In some situations, the phrase "device configured to" may mean that the device "is able to". For example, the phrase "processor adapted (or configured) to perform A, B, and C" may mean either a dedicated processor (such as, e.g., embedded processor) only for performing the corresponding operations or a generic-purpose processor (such as, e.g., central processing unit (CPU) or application processor (AP)) that can perform many operations, including the corresponding operations, but is not limited to and/or otherwise designed for only performing those specific corresponding operations, by executing one or more software programs stored in a memory device.

The terms used herein are merely for the purpose of describing particular embodiments of the present disclosure and are not intended to limit the scope of the present disclosure. As used herein, singular forms of words may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the same meaning as used in the context of the relevant field of art, and such terms are not to be interpreted to have ideal or excessively formal meanings unless clearly defined in the present disclosure. In any event, any term defined in the present disclosure should not be interpreted in such a way as to exclude embodiments of the present disclosure.

Hereinafter, a communication device and a user terminal according to various embodiments of the present disclosure are described with reference to the accompanying drawings. In the present disclosure, the "user" may be a person using a device/terminal or an apparatus using the device/terminal (for example, an artificial intelligence electronic device).

Figure 1B:
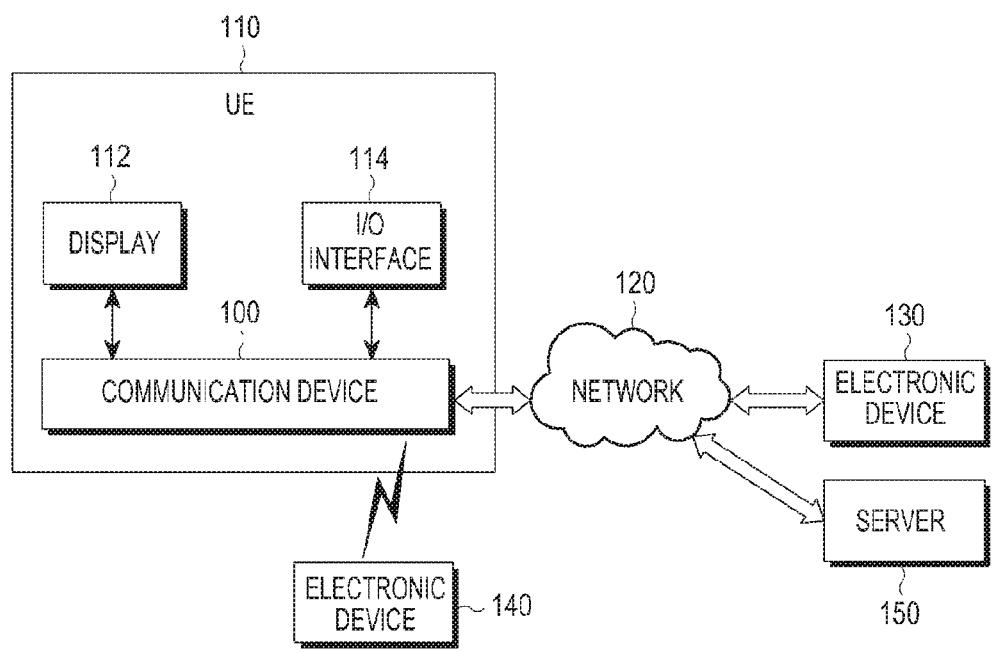
FIG. 1B is a diagram of a user equipment including communication device 100 from FIG. 1A in a network environment, according to an embodiment of the present disclosure.
Figure 1C:
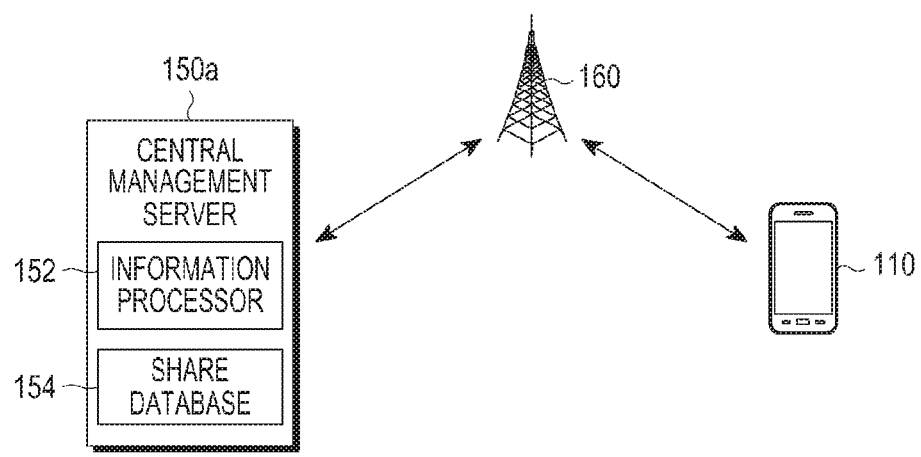
FIG. 1C is a diagram of a communication system including UE 110 from FIG. 1B according to an embodiment of the present disclosure.

In FIG. 1A, communication device 100 according to an embodiment of the present disclosure includes transceiver 101, processor 102, and memory 103. In FIG. 1B, communication device 100 is shown in UE 110 in a network environment. In FIG. 1C, UE 110 is shown in a cellular communication system.

The transceiver 101 configures communication between communication device 100 and any external device (such as, e.g., first external electronic device 130, second external electronic device 140, or server 150 in FIG. 1B). For example, the transceiver 101 may connect to network 120 in FIG. 1B through wireless or wired communication, and may communicate with external devices. "Transceiver" as used herein is interchangeable with terms such as "communication module", "communication interface", or the like, as would be understood by one of ordinary skill in the art.

The communication device may use one or more cellular communication protocols such as, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM). Further, the communication device may have short-range wireless communication, such as, for example, Wi-Fi, Bluetooth, and/or Near Field Communication (NFC). The communication device may also receive signals from one or more Global Navigation Satellite Systems (GNSSs), such as, for example, the U.S. Global Positioning System (GPS), the Russian Global Navigation Satellite System (GLONASS), the Chinese Navigation Satellite System (Beidou), and/or the European Global Satellite-based Navigation System (Galileo).

The wired communication of the communication device may include at least one interface for, for example, a Universal Serial Bus (USB), a High Definition Multimedia Interface (HDMI), Recommended Standard 232 (RS-232), and a Plain Old Telephone Service (POTS). The network 120 in FIG. 1B may include communication networks such as one or more computer networks (for example, a Local Area Network (LAN) or a Wide Area Network (WAN)), the Internet, and a telephone network.

The processor 102 may include one or more of a Communication Processor (CP), a Central Processing Unit (CPU), and an Application Processor (AP). The processor 102 may carry out operations or data processing related to control and/or communication of one or more other elements of the communication device 100. "Processor" as used herein is interchangeable with terms such as "control module", "control unit", "controller", or the like, as would be understood by one of ordinary skill in the art.

The memory 103 may include a volatile memory and/or a non-volatile memory. The memory 103 may store, for example, software/programs, commands, and/or data, which may be related to at least one other element of the communication device 100. Possible software and/or programs stored may include, for example, a kernel, middleware, an application programming interface (API), an application program (or "application"), and/or the like. In other embodiments, the memory may not be included in the communication device.

FIG. 1B shows a network environment including user equipment (UE) 110 comprising communication device 100, according to an embodiment of the present disclosure.

User equipment 110 includes, besides communication device 100, display 112 and input/output interface 114. Display 112 may be a Liquid Crystal Display (LCD), a Light-Emitting Diode (LED) display, an Organic Light-Emitting Diode (OLED) display, a Micro Electro Mechanical Systems (MEMS) display, and/or an electronic paper display. The display 112 may display various types of content (e.g., text, images, videos, icons, or symbols) and may include a touch screen which can receive, for example, a touch input, a gesture input, a proximity input, or a hovering input using an electronic pen or a user's body part. The input/output interface 114 serves as an interface to transfer instructions or data, which is input from a user or another external device, to element(s) within user equipment 110 and to output instructions or data received from element(s) within the user equipment 110 to a user or another external device. In other embodiments, the user equipment further includes a storage module (e.g., a memory) and/or a processor (e.g., an application processor).

FIG. 1C is a diagram of a cellular communication system including UE 110 according to an embodiment of the present disclosure.

In FIG. 1C, the cellular communication system includes the user equipment 110, a central management server 150a, and an evolved-NodeB (eNB) 160. Central management server 150a is an example of server 150 in FIG. 1B. The central management server 150a includes an information processor 152 and a share database 154. The user equipment 110 and the central management server 150a may connect through the eNB 160. Herein, an eNB such as eNB 160 may also be referred to by various terms such as an Access Point (AP), a Base Transceiver System (BTS), and the like, as would be understood by one of ordinary skill in the art.

Figure 2:
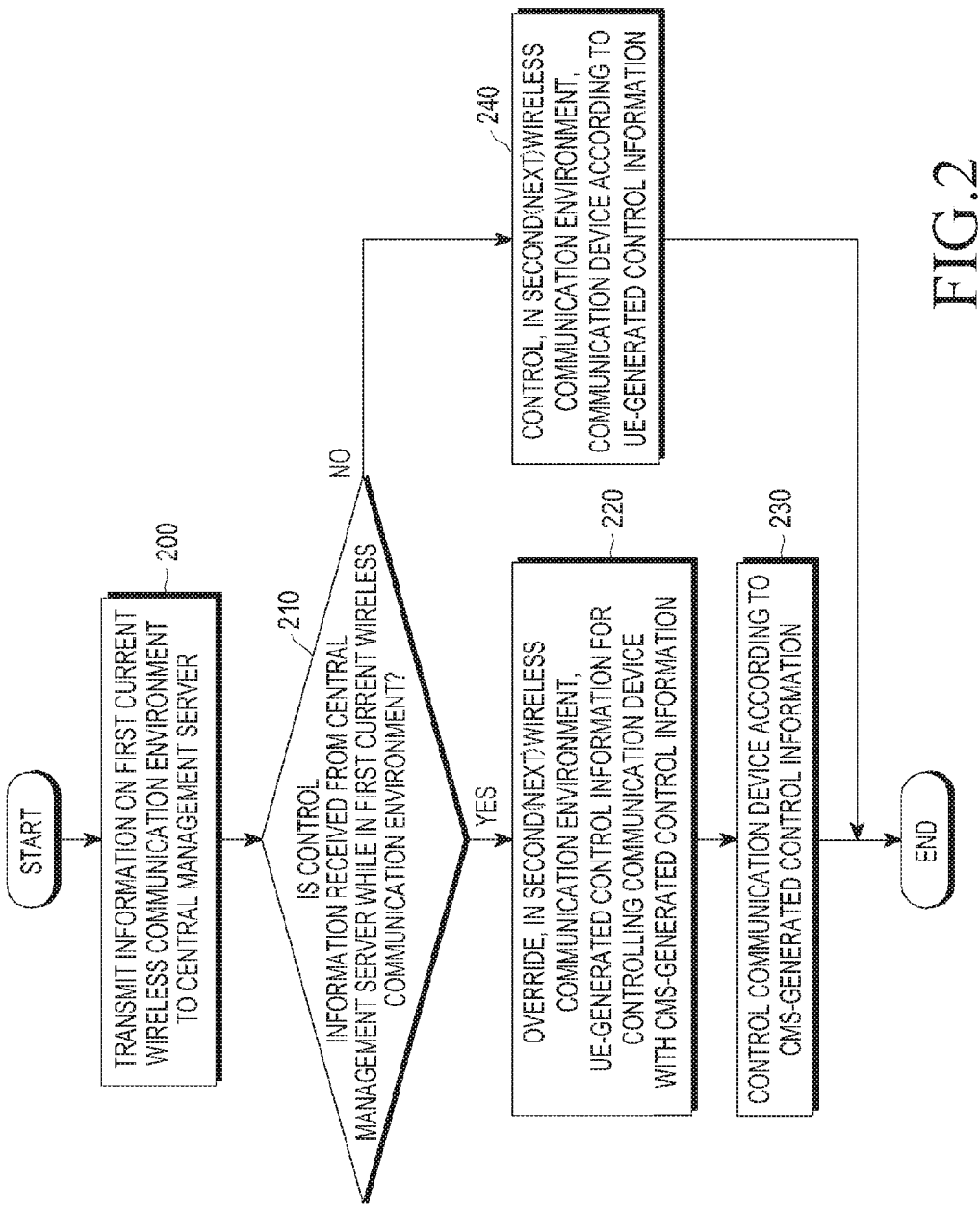
FIG. 2 is a flowchart of a method for a communication device/UE to control its operations by providing current environment information to a central management server according to an embodiment of the present disclosure.

FIG. 2 is a flowchart of a method for a communication device to control its operations by providing current environment information to a central management server according to an embodiment of the present disclosure. In the description of FIG. 2, reference will be made to FIG. 3 to provide examples of specific operations.

In the embodiment of FIG. 2, there are two types of device control information: that are generated by the communication device or a UE ("first" or "UE-generated control information") and that generated and/or sent by a central management server ("CMS-generated control information"). The central management server generates its device control information based, at least in part, on current environment information provided by the UE. The UE uses one of the two types of device control information to control its operations. The UE-generated control information and the CMS-generated control information comprise the same types of control information (such as, e.g., an Infinite Impulse Response (IIR) filter coefficient) but may have different parameter values (e.g., "3" rather than "5" for the value of the IIR filter coefficient) from each other.

In step 200, information (e.g., one or more parameters) of a first (or current) wireless communication environment is transmitted to the central management server. In step 210, it is determined whether CMS-generated control information has been received from the central management server while in the first wireless communication environment.

Wireless communication environment parameters may be the position or transmission rate of the communication device or UE, a reception signal power (e.g., Received Signal Strength Indication (RSSI)), a signal-to-noise ratio (SNR), a maximum delay path, a Doppler frequency, timing offset, and/or frequency offset. The position of the UE may be determined by GPS or an Observed Time Difference Of Arrival (OTDOA) scheme, and the transmission rate may be measured by an accelerometer included in the UE. A first (or current) wireless communication environment parameter refers to a condition or measurement of the current wireless communication environment.

In the present disclosure, first or the UE-generated control information and second or CMS-generated control information include various parameters for controlling the communication device in a specific wireless communication environment. The parameters may be for controlling a modulator/demodulator for modulating or demodulating a received signal, for controlling a channel estimator (e.g., a Finite Impulse Response/Infinite Impulse Response (FIR/IIR) filter coefficient), and/or for performing synchronization with the eNB. However, a difference between the UE-generated control information and the CMS-generated control information is that the UE-generated control information is generated according to an operation scheme already stored in the communication device or user equipment according to the current wireless communication environment, that is, based on the limited range or limited logical structure configured by the communication device, but the CMS-generated control information is generated with reference to information including parameter having the highest index among ever-changing performance indices measured according to values of various parameters in a specific wireless communication environment.

For example, in a case in which the communication device 100 is moving at 30 km/h from a location Samsungno 129, Yeongtong-gu, Suwon-si, Republic of Korea, the value of an IIR filter coefficient according to the UE-generated control information may be 3, while the value of the IIR filter coefficient according to the CMS-generated control information corresponds to the highest performance index and may be, e.g., 5, which is determined according to a predetermined criteria, among performance indices (e.g., a tracking time for a transient state of a filter, a jitter value for a steady state, Cyclic Redundancy Check (CRC) code information, throughput information, and Adaptive Modulation and Coding (AMC) information) according to a value of each coefficient by changing values of the IIR filter coefficient (e.g., changing from 1 to 7). Such information may be stored in a database, such as the share database 154 of CMS 150a in FIG. 1C, of the central management server.

The predetermined criteria for selecting an optimal value for the parameters or determining the priority may involve, for example, measuring a frequency for parameter values corresponding to the highest performance index and selecting a parameter value having the highest frequency, or converting the frequency to a weighted value and then calculating a parameter value using a Maximum Ratio Combining (MRC) scheme.

UE-generated control information may be pre-stored in a memory (such as, e.g., memory 103) or storage unit of the communication device 100 (and may be stored in the form of a look-up table), calculated and/or determined by the communication device 100 according to a predetermined method (e.g., calculations based on established/stored formulae) using various pieces of information received from the eNB serving the communication device 100, and/or provided by the central management server.

The CMS-generated control information may be generated in a large variety of ways, depending on the embodiment of the present disclosure. Moreover, CMS-generated control information may comprise/be generated from many different types of information. For example, when a communication device 100 initially corresponds with its specific wireless communication environment (e.g., when a performance test is performed as or before the communication device 100 is launched), the measured control information may be stored by the CMS as "history information" for generating CMS control information for the communication device 100. When CMS-generated control information is transmitted to the communication device 100, all control information stored in the CMS database may be transmitted, or only a part of the CMS-stored control information may be transmitted.

Figure 3:
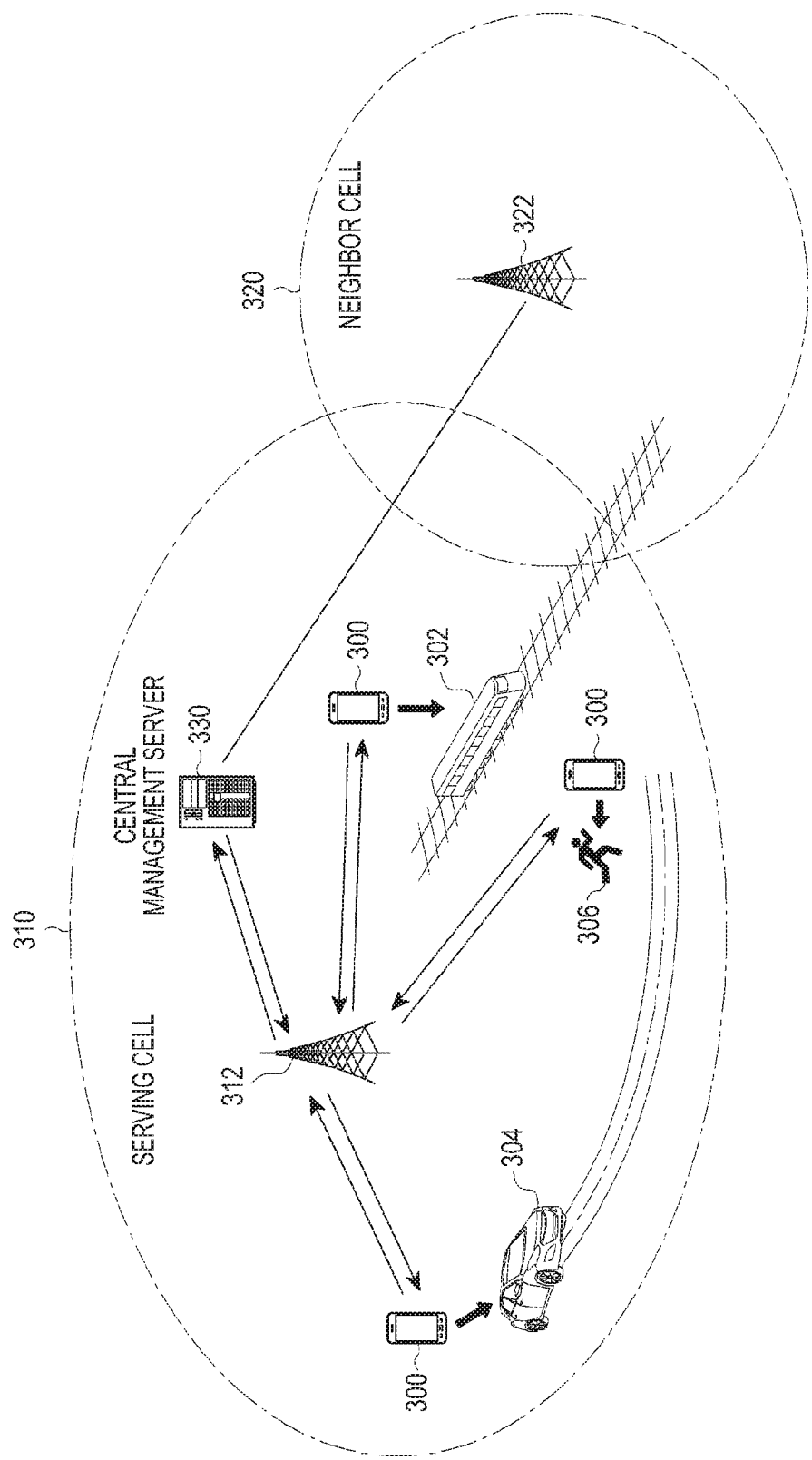
FIG. 3 illustrates an example of providing control information to a communication device/UE according to an embodiment of the present disclosure.

Examples of steps 200 and 210 may be described referring to FIG. 3, in which UE 300 is shown in a number of possible locations, including, for example, on moving train 302, in moving automobile 304 on a highway, or carried by moving user 306. Train 302 and automobile 304 are non-limiting examples of transportation, used here merely for convenience. No matter which means of transportation, information on the present position and current moving speed of UE 300 is transmitted to the central management server (CMS) 330 (i.e., step 200 of FIG. 2). By collectively taking the current position, the current speed, and other factors (such as, e.g., current traffic conditions where automobile 304 is located) into consideration, it is possible to predict a position (including a position in a neighbor cell 322) or a speed UE 300 will have after a predetermined time. The central management server 330 may transmit CMS-generated control information concerning the second (or next/future) wireless communication environment of UE 300 on the basis of information transmitted from UE 300, while still in the first (or current) wireless communication environment.

In step 210 of FIG. 2, it is determined whether such CMS-generated control information has been received by the communication device 100. If such CMS-generated control information is received, step 220 of overriding the UE-generated control information for controlling the communication device 100 for the CMS-generated control information (i.e., changing the CMS-generated control information to top priority) is performed, and then, in step 230, the communication device 100 is controlled according to the CMS-generated control information while in the second (or next, i.e., now current) wireless communication environment. The CMS-generated control information may include an identifier indicating the overriding function, or the communication device 100 may perform the overriding function merely because the CMS-generated control information has been received. The central management server 330 in FIG. 3 is connected to eNB 312 of serving cell 310 and eNB 322 of neighbor cell 320.

Accordingly, according to various embodiments of the present disclosure, the communication device 100 may be actually controlled on the basis of the CMS-generated control information, resulting in enhanced performance in the second wireless communication environment in which the communication device 100 is located so that performance of the communication device 100 can be improved.

If it is determined that CMS-generated control information has not been received by the communication device 100 in step 210, the communication device 100 is controlled depending on the UE-generated control information in the second/next wireless communication environment.

Figure 4:
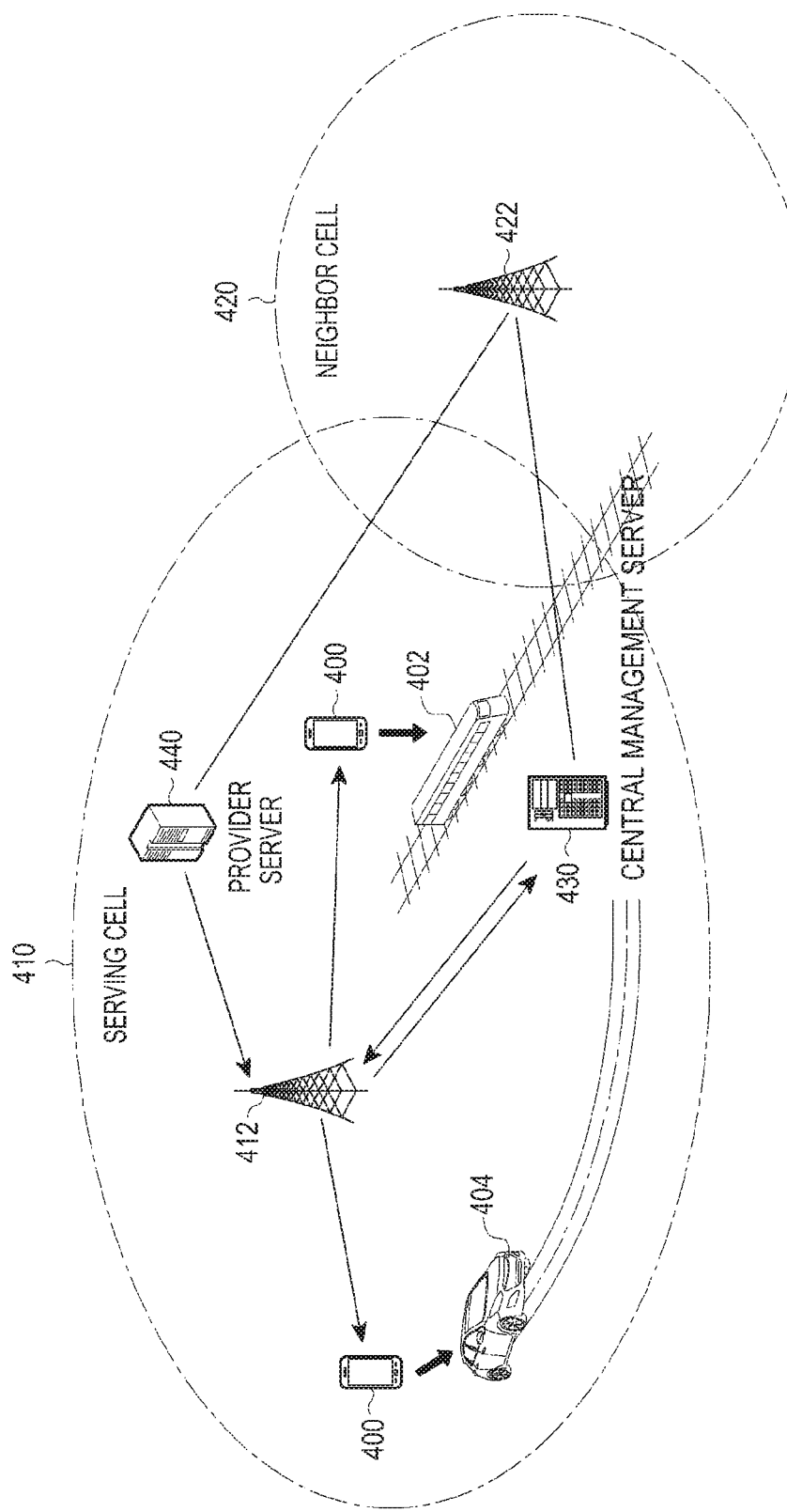
FIG. 4 illustrates an example of a provider server providing communication environment information to the central management server (CMS) according to an embodiment of the present disclosure.

FIG. 4 illustrates an example where the current communication environment information is provided to the CMS by a provider server according to an embodiment of the present disclosure.

In FIG. 4, the information on the first wireless communication environment is not provided by the communication device 400, but is rather provided by provider server 440 of the provider of the means of transportation by which the communication device 400 is moving. For example, information (e.g., the position or speed of train 402 or automobile 404) on the first communication environment is provided from a GPS module (not shown) and/or various sensor modules included in the means of transportation to the provider server 440, which then transmits the information to the central management server (CMS) 430. In FIG. 4, CMS 430 and provider server 440 are connected to eNB 412 of serving cell 410 and eNB 422 of neighbor cell 420.

Figure 5:
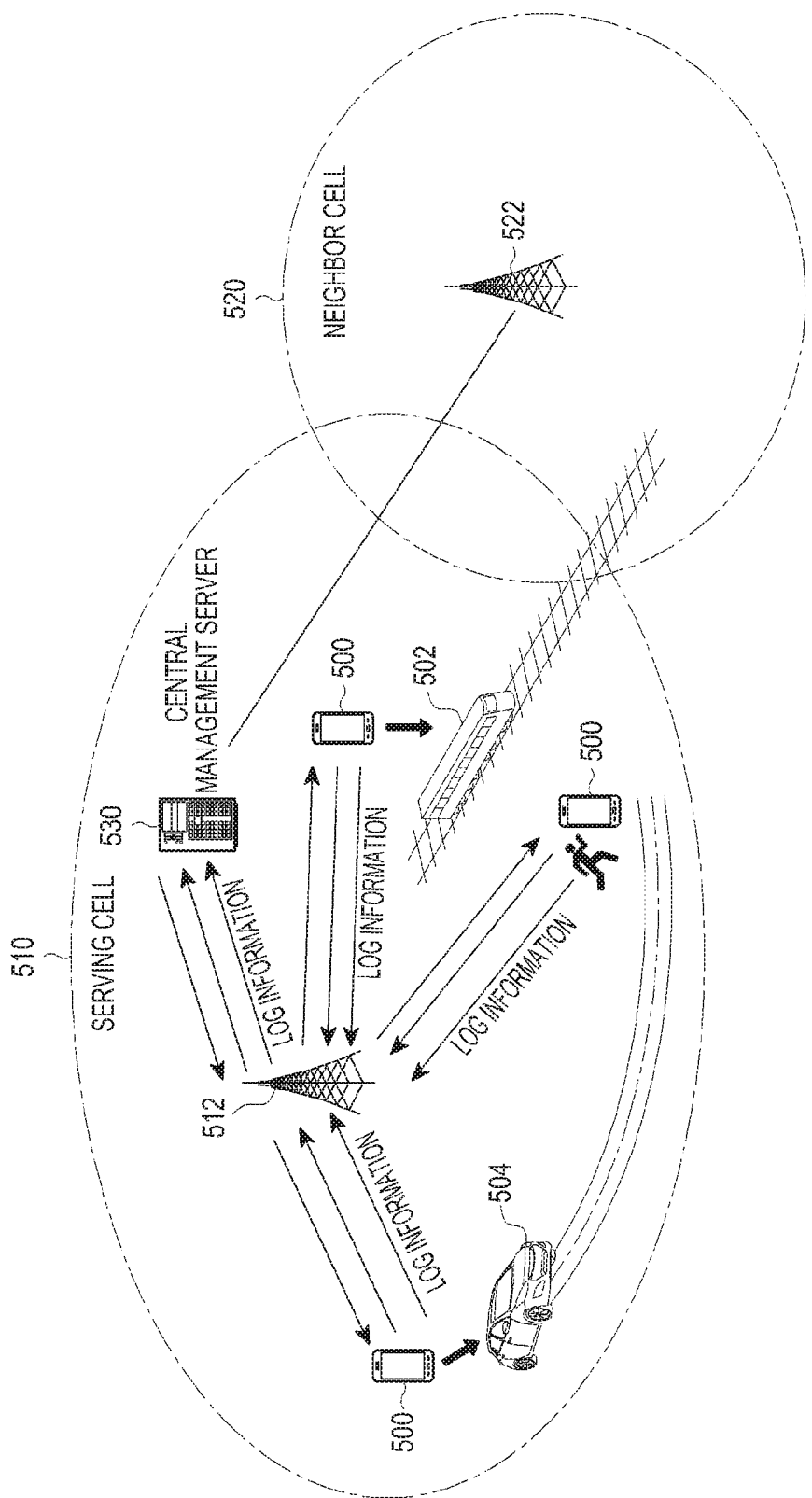
FIG. 5 illustrates an example in which log information is transmitted to the central management server and the priority of device control information stored in the central management server is adjusted and/or re-determined according to an embodiment of the present disclosure.

FIG. 5 illustrates an example in which log information is transmitted to the central management server and the priority of device control information stored in the central management server is adjusted or re-determined according to an embodiment of the present disclosure.

In FIG. 5, when communication device 100 or UE 500 is in a new wireless communication environment, it performs, in order for the CMS to decide whether to re-configure, re-determine, and/or update the priority of the CMS-stored device control information, a function/operation to provide one or more parameters by which the CMS-stored device control information is determined. When communication device 500 receives CMS-generated control information, the communication device 500 performs a function/operation to determine a parameter of the received CMS-generated control information (such as, e.g., a parameter for controlling the channel estimator), in the new wireless communication environment during a predetermined time, and then transmits the determined parameter (i.e., information on the new wireless communication environment) and log information to CMS 530. Information on the log information and the new wireless communication environment may be transmitted to the CMS 530 in a scheme such as an indexing scheme, a compressing scheme, a transform scheme, or a priority sorting scheme.

The log information may include the values of the various parameters and performance indices corresponding to the values of the parameters. Further, the log information may include various pieces of information such as cell identification information, a signal-to-noise ratio for a reception signal, timing offset, and frequency offset, Doppler frequency information, reception signal power, and channel state information.

When the log information is received, the CMS 530 may re-determine a priority according to a method of determining a pre-determined priority on the basis of a result of the performance index. The method of pre-determining the priority may be applied to the method of determining the priority described above. The performance indices may be stored in the share database of the CMS according to the re-determined priority. Like FIGS. 3 and 4, the CMS 530 is connected to eNB 512 of serving cell 510 and eNB 522 of neighbor cell 520.

Figure 6:
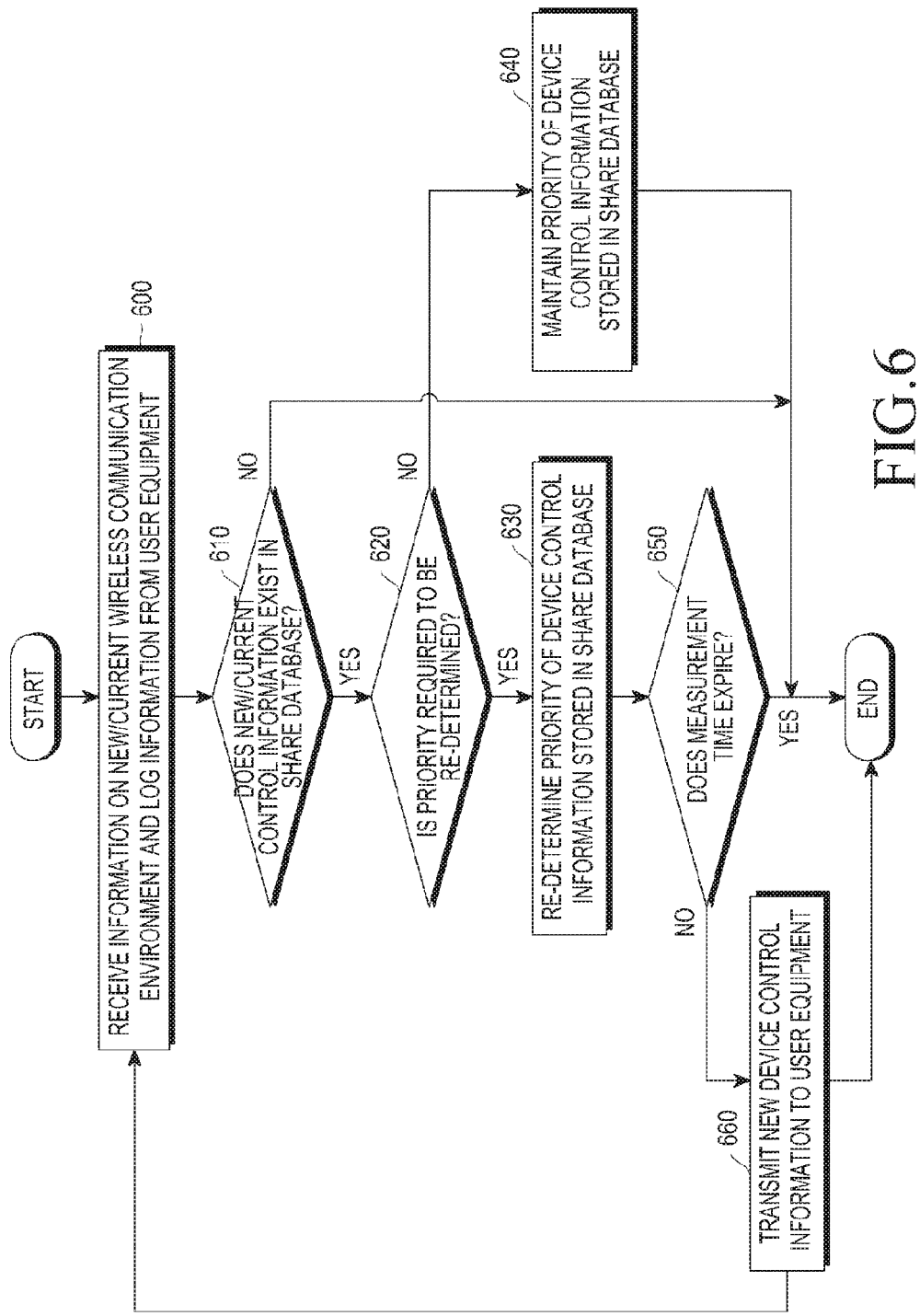
FIG. 6 is a flowchart of a method for a central management server to determine whether to adjust/re-determine the priority of device control information stored by the central management server according to an embodiment of the present disclosure.

FIG. 6 is a flowchart of a method in which the priority of CMS-generated control information is re-determined by the CMS according to an embodiment of the present disclosure.

In step 600, the CMS receives information on a new wireless communication environment and log information from a UE. In step 610, the CMS decides whether device control information on the new/current wireless communication environment exists in a share database of the CMS.

If device control information on the new/current wireless communication environment exists, the CMS decides whether the priority of the device control information must be re-determined in step 620. For example, when the priority, which is determined according to a predetermined criteria, of a performance index transmitted from the UE is different from a priority of the device control information stored by the CMS, the priority of the device control information is required to be re-determined in step 620. If the priority of the stored device control information is to be re-determined, the CMS re-determines the priority of the device control information stored in its database in step 630. If the priority of the stored device control information is not to be re-determined, the priority of the device control information stored in the CMS database is maintained, that is, there is no change of the priority, in step 640.

After re-determining the priority of the device control information stored by the CMS in step 630, it is determined in step 650 whether the predetermined time to perform a function/operation to determine the new control information based on the re-determined priority has expired. If the predetermined time has not expired, the CMS transmits the new device control information, which is of a type different from the type of the device control information previously transmitted to the communication device 500, in step 660. Through step 660, the communication device 500 may perform a function or an operation in which device control information is determined even for the type of control information which the CMS share database does not have.

The term "module" as used herein may, for example, refer to hardware, software, firmware, and/or a combination of two or more of them. The term "module" may be used interchangeably with, for example, the terms "unit", "logic", "logical block", "component", or "circuit". A module may be a minimum unit or a part of an integrated component element or a minimum unit or a part of a component for performing one or more functions. A module may be mechanically, electronically, and/or software implemented.

For example, a module according to the present disclosure may be any one or more of an Application-Specific Integrated Circuit (ASIC) chip, a Field-Programmable Gate Arrays (FPGA), and/or a programmable-logic device for performing operations which are presently known or are developed later.

According to various embodiments, at least some of the devices (for example, modules or functions thereof) or the methods (for example, operations) according to the present disclosure may be implemented by commands, instructions, routines, programs, and the like stored in a non-transitory computer-readable storage medium. Such stored instructions, when executed by a controller, control module, or the like (such as, e.g., processor 102), causes functions corresponding to the instructions to be performed. The non-transitory computer-readable storage medium may be, for example, memory 103.

The non-transitory computer readable recoding medium may be one or more of a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high level language codes, which can be executed using an interpreter, as well as machine codes made by a compiler from language codes. The aforementioned hardware device may be configured to operate as one or more software modules in order to perform one or more operations of the present disclosure, and vice versa.

Elements according to the present disclosure may include one or more of the aforementioned components or may further include other additional components, or some of the aforementioned components may be omitted. Operations according to various embodiments of the present disclosure may be executed sequentially, in parallel, repeatedly, or in a heuristic manner. Further, some operations may be executed in a different order or may be omitted, or other operations may be added.

Various embodiments disclosed herein are provided to more easily describe the present disclosure and to make it easier to understand the present disclosure, and are not intended to limit the scope of the present disclosure. Accordingly, it will be understood by those skilled in the art that various changes in form and details may be made therein without departing from the spirit and scope of the disclosure as defined by the appended claims and their equivalents.

What is claimed is:

1. A communication device comprising:
   a transceiver;
   a memory that stores device control information for controlling the communication device in a second wireless communication environment; and
   a processor that is electrically connected to the transceiver and the memory, wherein the processor:
   determines if the device control information for controlling the communication device in the second wireless communication environment has been received from a central management server (CMS) while the communication device is in a first wireless communication environment,
   overrides first control information with the device control information when the communication device is in the second wireless communication environment, and controls the communication device according to the device control information received from the CMS while the communication device is in the second wireless communication environment, wherein the first control information includes a parameter value determined based on a range configured by the communication device, and wherein the device control information includes a parameter value determined based on performance indices measured in the second wireless communication environment.

2. The communication device of claim 1, wherein the processor further controls the transceiver to transmit, to the CMS, information on the first wireless communication environment.

3. The communication device of claim 2, wherein the information on the first wireless communication environment comprises information on a position and a velocity of the communication device.

4. The communication device of claim 1, wherein the first control information includes information pre-determined according to a wireless communication environment of the communication device.

5. The communication device of claim 1, wherein the device control information received from the CMS is associated with log information previously obtained by the communication device and presently stored in the CMS.

6. The communication device of claim 1, wherein the processor, after overriding the first control information, controls the transceiver to transmit obtained log information to the central management server.

7. The communication device of claim 1, wherein information on the first wireless communication environment is provided to the CMS by a provider server associated with a current location of the communication device.

8. The communication device of claim 7, wherein the current location of the communication device is on a moving transportation object and the provider server is associated with the moving transportation object.

9. A method of controlling a communication device, the method comprising:

determining whether device control information for controlling the communication device in a second wireless communication environment has been received from a central management server (CMS) while the communication device is in a first wireless communication environment;

if the device control information has been received from the CMS, overriding first control information with the device control information from the CMS when the communication device is in the second wireless communication environment; and controlling the communication device according to the device control information received from the CMS while the communication device is in the second wireless communication environment, wherein the first control information includes a parameter value determined based on a range configured by the communication device, and wherein the device control information includes a parameter value determined based on performance indices measured in the second wireless communication environment.

10. The method of claim 9, further comprising:

transmitting, to the CMS, information on the first wireless communication environment.

11. The method of claim 10, wherein the information on the first wireless communication environment comprises information on a position and velocity of the communication device.

12. The method of claim 9, wherein the first control information includes information pre-determined according to a wireless communication environment of the communication device.

13. The method of claim 9, wherein the device control information received from the CMS is associated with log information previously obtained by the communication device and presently stored in the CMS.

14. The method of claim 9, further comprising:

obtaining log information; and transmitting log information to the CMS, wherein the log information is stored by the CMS and used to generate the device control information.

15. The method of claim 9, wherein information on the first wireless communication environment is provided to the CMS by a provider server associated with a current location of the communication device.

16. The method of claim 15, wherein the current location of the communication device is on a moving transportation object and the provider server is associated with the moving transportation object.

* * * * *